(12) United States Patent
Song et al.

(10) Patent No.: US 7,103,256 B2
(45) Date of Patent: Sep. 5, 2006

(54) BLOCK BASE HAVING TREE-STRUCTURED GROOVE ARRAY, MULTI-CORE OPTICAL FIBER BLOCK HAVING TREE-STRUCTURED GROOVE ARRAYS, AND METHOD FOR ALIGNING OPTICAL FIBER ARRAYS IN THE SAME

(75) Inventors: Hyun-Chae Song, Suwon-shi (KR); Byung-Gil Jeong, Taegukwangyok-shi (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 10/354,348

(22) Filed: Jan. 30, 2003

(65) Prior Publication Data
US 2003/0169995 A1  Sep. 11, 2003

(30) Foreign Application Priority Data
Feb. 2, 2002  (KR) ............... 10-2002-0006057

(51) Int. Cl.
*G02B 6/00* (2006.01)
(52) U.S. Cl. ........................ 385/137; 385/83
(58) Field of Classification Search ........... 385/137, 385/83, 65, 114
See application file for complete search history.

(56) References Cited

U.S. PATENT DOCUMENTS

| | | | | |
|---|---|---|---|---|
| 2,537,044 A | * | 1/1951 | Garbo ...................... 62/644 |
| 4,181,400 A | * | 1/1980 | Malsot et al. .............. 385/83 |
| 4,364,064 A | | 12/1982 | Baues ...................... 346/107 |
| 4,389,655 A | * | 6/1983 | Baues ...................... 347/241 |
| 4,405,207 A | | 9/1983 | Kay ......................... 350/320 |
| 4,784,456 A | * | 11/1988 | Smith ....................... 385/55 |
| 4,880,494 A | | 11/1989 | Kaukeinen et al. ......... 156/633 |
| 4,911,526 A | * | 3/1990 | Hsu et al. .................. 385/115 |
| 4,923,275 A | * | 5/1990 | Kaukeinen .................. 385/53 |
| 4,991,930 A | * | 2/1991 | Baek et al. ................. 385/115 |
| 5,109,460 A | * | 4/1992 | Baek et al. ................. 385/115 |
| 6,049,646 A | * | 4/2000 | Boscher ..................... 385/49 |
| 6,321,020 B1 | * | 11/2001 | Fukuyama et al. .......... 385/137 |
| 6,421,493 B1 | * | 7/2002 | Burek et al. ................ 385/134 |
| 6,535,685 B1 | * | 3/2003 | Tullis ........................ 385/137 |
| 6,553,173 B1 | * | 4/2003 | Goto ......................... 385/137 |
| 6,965,721 B1 | * | 11/2005 | Tullis et al. ................ 385/137 |
| 2002/0076189 A1 | * | 6/2002 | McMullin et al. .......... 385/137 |
| 2002/0141725 A1 | * | 10/2002 | Harr et al. .................. 385/137 |
| 2003/0021572 A1 | * | 1/2003 | Steinberg ................... 385/137 |
| 2004/0105650 A1 | * | 6/2004 | Imaki ........................ 385/137 |

FOREIGN PATENT DOCUMENTS

| EP | 1176441 A2 | 1/2002 |
|---|---|---|
| JP | 59224812 | 12/1984 |
| JP | 09-197193 | 7/1997 |
| JP | 10-010352 | 1/1998 |

(Continued)

*Primary Examiner*—Ellen E. Kim
(74) *Attorney, Agent, or Firm*—Cha & Reiter, L.L.C.

(57) ABSTRACT

Disclosed is a multi-core optical fiber block having a block base and a cover, each of which is formed having a tree-structured groove array, so as to allow respective optical fiber arrays to be seated in the corresponding respective groove arrays. The groove arrays comprises first sub-grooves having depth and pitches decreasing in magnitude as approaching from an input end of the block to an output end, and second sub-grooves formed alternately between the first sub-grooves and having the depths and pitches increasing in magnitude as approaching from the input end of the block to the output.

6 Claims, 23 Drawing Sheets

FOREIGN PATENT DOCUMENTS

| | | |
|---|---|---|
| JP | 10-213721 | 8/1998 |
| JP | 10213721 | 8/1998 |
| JP | 11-326704 | 11/1999 |
| JP | 2000-081528 | 3/2000 |

* cited by examiner

BLOCK BASE HAVING TREE-STRUCTURED GROOVE ARRAY, MULTI-CORE OPTICAL FIBER BLOCK HAVING TREE-STRUCTURED GROOVE ARRAYS, AND METHOD FOR ALIGNING OPTICAL FIBER ARRAYS IN THE SAME

CLAIM OF PRIORITY

This application claims priority to an application entitled "BLOCK BASE HAVING TREE-STRUCTURED GROOVE ARRAY, MULTI-CORE OPTICAL FIBER BLOCK HAVING TREE-STRUCTURED GROOVE ARRAYS, AND METHOD FOR ALIGNING OPTICAL FIBER ARRAYS IN THE SAME," filed in the Korean Industrial Property Office on Feb. 2, 2002 and assigned Serial No. 2002-6057, the contents of which are hereby incorporated by reference.

BACKGROUND OF THE INVENTION

1. Field of the Invention

The present invention generally relates generally to an optical device. In particular, the invention relates to a block base having tree-structured groove arrays and a multi-core optical fiber block with a tree-structured groove array, and method for aligning optical fiber arrays in the multi-core optical fiber block.

2. Description of the Related Art

A multi-core optical fiber block is typically used for aligning an array of cores or strands of a multi-core optical fiber cable relative to an input or output terminal of a planar light wave circuit (PLC). The optical fiber block is also used as an input/output terminal of an optical device, such as a micro-optic device.

In general, a multi-core optical fiber block comprising a block base and a cover has been manufactured according to the following steps:

Step 1. seating an array of cores or strands of a multi-core optical fiber cable onto a plurality of V-shaped grooves, which are formed on a top surface of the block base made of silicon, quartz, glass or the like and which have a uniform pitch, depth and length, wherein the array of cores or strands of the multi-core optical fiber cable is typically prepared by partially removing a sheath from the multi-core optical fiber cable;

Step 2. covering the array of cores with a cover having a plurality of V-shaped grooves which are formed on a bottom surface of the cover and which have uniform pitch, depth and length;

Step 3. fixing the array of cores, the block base, and the cover using an adhesive such as epoxy resin; and Step 4. polishing an end face of the block.

FIG. 1 is a schematic perspective view of a multi-core optical fiber block according to the prior art. FIG. 2 is a perspective of a block base of the multi-core optical fiber block shown in FIG. 1. FIG. 3 is a side view of the multi-core optical fiber block shown in FIG. 1. As shown in FIG. 1, a multi-core optical fiber block comprises first and second ribbon type multi-core optical fiber cables 110 and 140, respectively, a block base 170 and a cover 210.

The first and second ribbon type multi-core optical fiber cables 110 and 140, respectively, are layered horizontally, and have their respective sheaths 130 and 160 removed over a predetermined length at the end. The portions on which the sheaths 130 and 160 are removed from the first and second ribbon type multi-core optical fiber cables 110 and 140, respectively, are called first and second bare or de-sheathed multi-core optical fiber arrays 120 and 150, respectively.

Referring to FIG. 2, the block base 170 includes a body 180 which has a top surface formed with sixteen (16) V-shaped grooves 200 having a uniform pitch, depth and length, and a support 190 which extends from the body 180. In the sixteen V-shaped grooves 200 are seated the first and second de-sheathed multi-core optical fiber arrays 120 and 150, respectively, each of which consist of eight cores or strands.

Referring back to FIG. 1, the cover 210 has a bottom surface formed with sixteen V-shaped grooves 220 which have a uniform pitch, depth and length. The V-shaped grooves 220 serve to fix the first and second de-sheathed multi-core optical fiber_arrays 120 and 150, respectively, together with the corresponding V-shaped grooves 200 of the block base 170.

Referring to FIG. 3, it is apparent that the first and second de-sheathed multi-core optical fiber arrays 120 and 150 must be precisely aligned so that a height $H_1$ of respective rhombic cavities formed by the V-shaped grooves 200 and 210 of the block base 170 and the cover 210 between both ends of the multi-core optical fiber block are uniform. However, as the first and second de-sheathed multi-core optical fiber arrays 120 and 150 aligned in the V-shaped grooves 200 of the block base 170 have a height(from the bottom surface of the block base 170) that is different from heights (from the bottom surface of the block base 170) of the first and second ribbon type multi-core optical fiber cables 110 and 140 during the alignment process, this alignment approach results in bending of the first and second de-sheathed multi-core optical fiber arrays 120 and 150. As a result, the first and second de-sheathed multi-core optical fiber arrays 120 and 150 deteriorate resulting in a decreased tensile strength breaking more easily upon any external force. Thus, there is a need to reduce bending of the first and second de-sheathed multi-core optical fiber arrays 120 and 150.

To reduce bending of the first and second de-sheathed multi-core optical fiber arrays 120 and 150, the first and second de-sheathed multi-core optical fiber arrays 120 and 150, respectively, are configured to extend at a predetermined length $L_1$ from one end of the body 180 of the block base 170. This approach has some drawbacks. First, when the first and second multi-core optical fiber arrays 120 and 150, which extend from the layered first and second ribbon type optical fiber cables 110 and 140, are seated and fixed in the narrow shallow grooves 200 of the block base 170, it is difficult to simultaneously align the first and second multi-core optical fiber arrays 120 and 150 in the grooves 200 of the block base 170. Second, when the multi-core optical fiber arrays 120 and 150 extend at a predetermined length $L_1$ from one end of the body 180 of the block base 170, and the multi-core optical fiber arrays have epoxy resin applied to respective portions which are not seated in the grooves 200 of the block base 170 to reduce bending of the multi-core optical fiber arrays 120 and 150, the epoxy resin is subjected to contraction or expansion as the portions applied with epoxy resin are widened. Due to this contraction and expansion, the multi-core optical fiber arrays 120 and 150 are subjected to a greater insertion loss as well as a higher possibility of breaking.

SUMMARY OF THE INVENTION

The present invention is to provide a block base having a groove array and a multi-core optical fiber block using the same, so as to minimize bending of the optical fiber array which is generated in an alignment process.

One aspect of the present invention is to provide a method for aligning optical fiber arrays in a multi-core optical fiber block, in which first and second optical fiber arrays, which extend from the first and second ribbon type optical fiber cables layered up and down, can be aligned in groove arrays of the block more easily.

According to one embodiment of the present invention, a block base having a tree-structured groove array is provided, so as to allow an optical fiber array to be seated in the groove array, the groove array including: first sub-grooves having a depth and a pitch decreasing from an input end of the block base to an output end; and, second sub-grooves formed alternately between the first sub-grooves and having a depth and a pitch increasing when approaching from the input end of the block base to the output end.

According to another embodiment of the present invention, a multi-core optical fiber block having tree-structured groove arrays, includes: a block base formed with a first groove array on a top surface thereof so as to allow an optical fiber array to be seated in the first groove array; and, a cover formed with a second groove array on a bottom surface thereof and aligned with the block base so as to cover the optical fiber array.

According to yet another embodiment of the present invention, a method for aligning a multi-core optical fiber block having tree-structured groove arrays is provided, including the steps of: aligning a first optical fiber array on a block base having a tree-structured groove array; aligning a cover having a tree-structured groove array with the block base in order to cover the first optical fiber array; and, inserting a second optical fiber array into cavities formed between the first optical fiber array and the cover.

DETAILED DESCRIPTION OF THE PREFERRED EMBODIMENT

Figure 1:
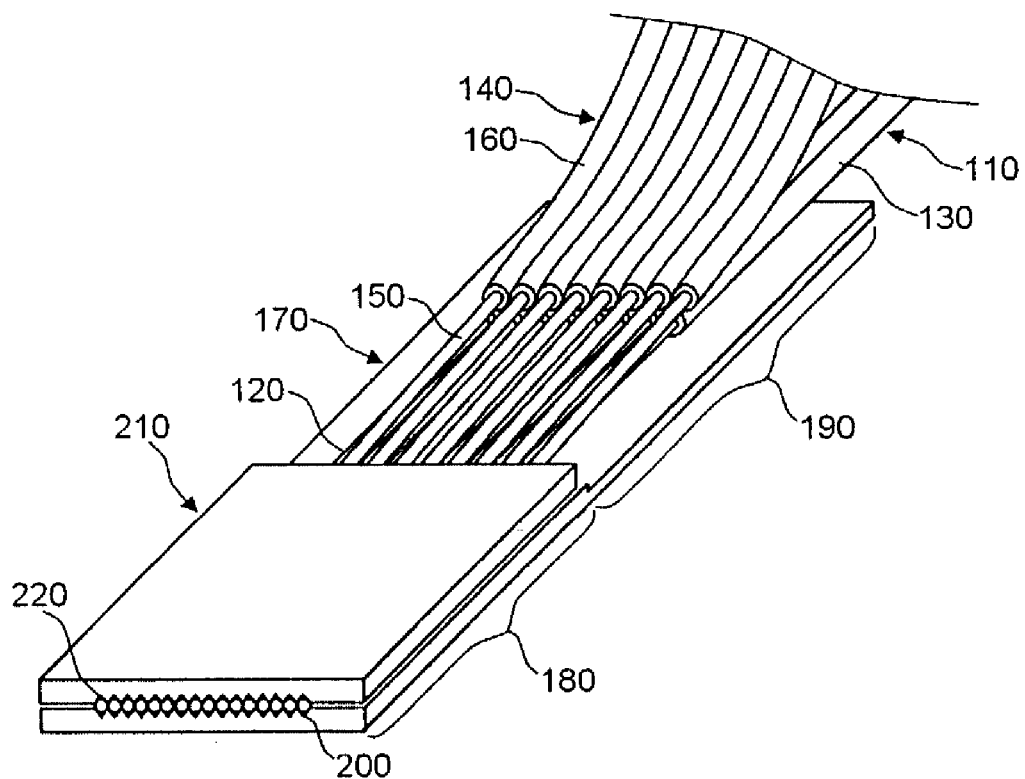
FIG. 1 is a schematic perspective view of a multi-core optical fiber block according to the prior art.
Figure 2:
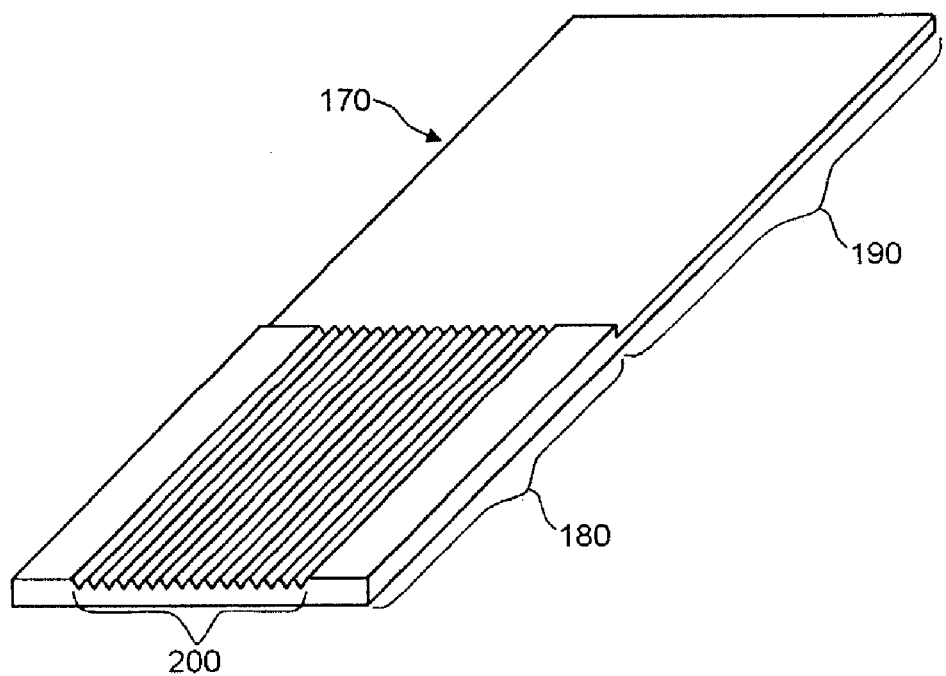
FIG. 2 is a perspective of the multi-core optical fiber block shown in FIG. 1.
Figure 3:
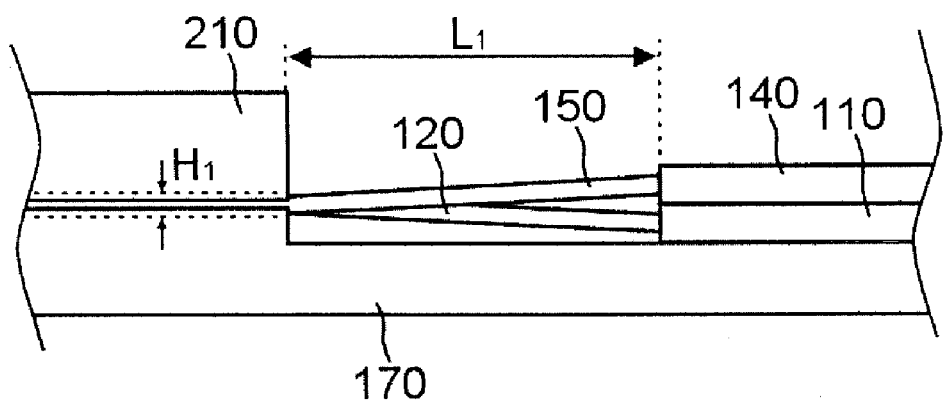
FIG. 3 is a side view of the multi-core optical fiber block shown in FIG. 1.

In accordance with the present invention, preferred embodiments of the present invention will be described in detail with reference to the accompanying drawings. In the drawings, the same element, although depicted in different drawings, will be designated by the same reference numeral or character. For the purposes of clarity and simplicity, a detailed description of known functions and configurations incorporated herein will be omitted as it may make the subject matter of the present invention unclear.

Figure 4:
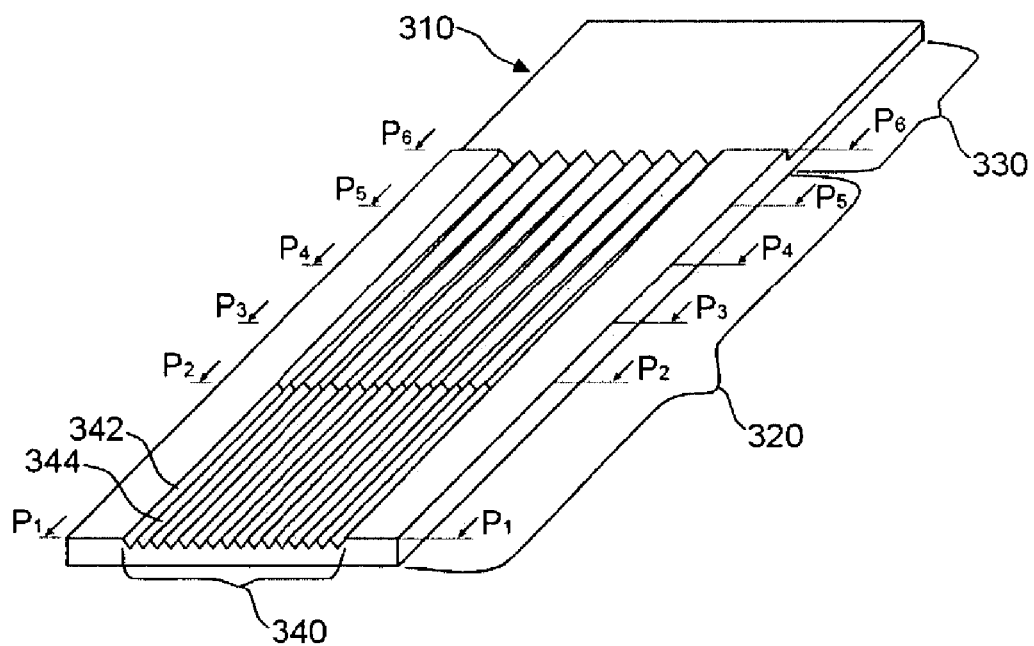
FIG. 4 is a perspective view of a block base having a tree-structured groove array according to one preferred embodiment of the present invention.
Figure 5A:
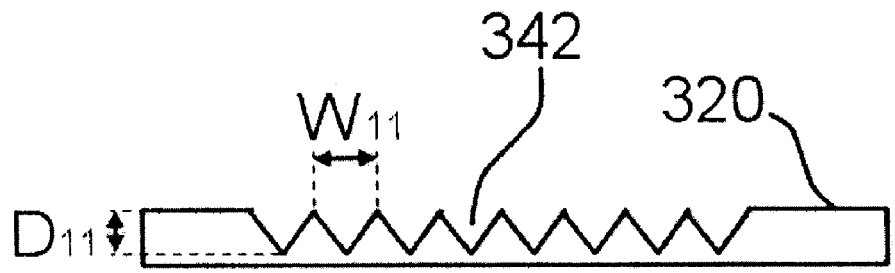
FIGS. 5A to 5F are cross sectional views taken along the lines $P_1$—$P_1$ to $P_6$—$P_6$ of FIG. 4.
Figure 5B:
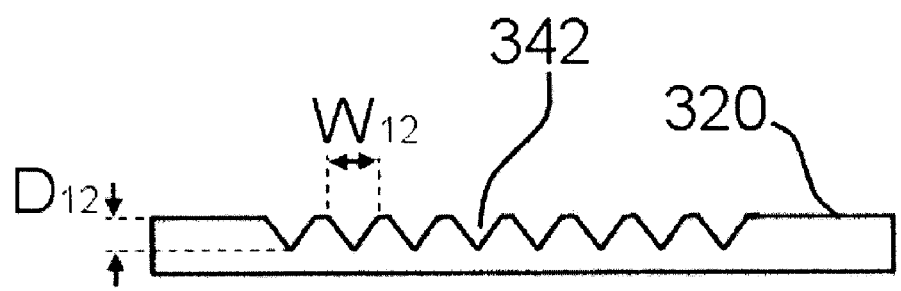
Figure 5C:
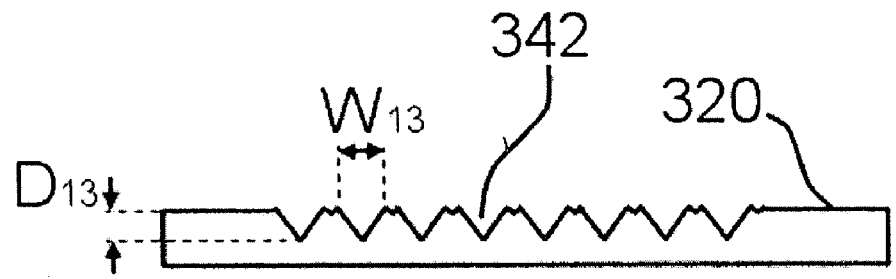
Figure 5D:
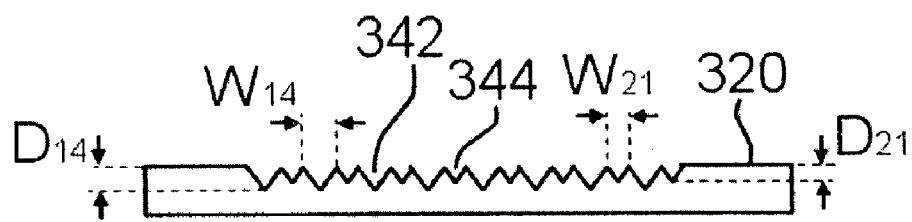
Figure 5E:
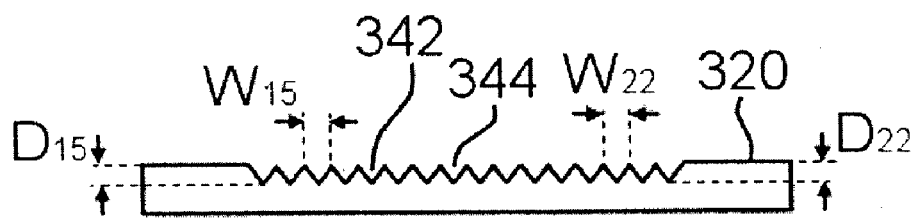
Figure 5F:
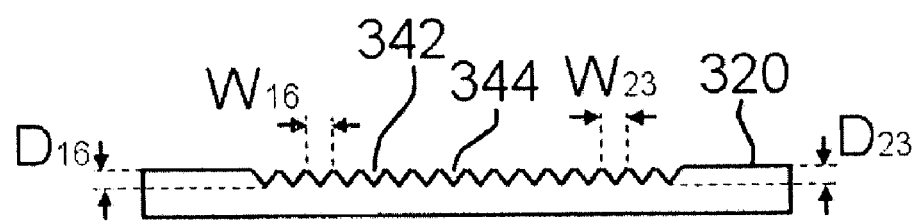

FIG. 4 is a perspective view of a block base having a tree-structured groove array according to one preferred embodiment of the present invention. FIGS. 5A to 5F are cross sectional views taken along the lines $P_1$—$P_1$ to $P_6$—$P_6$ of FIG. 4.

The block base 310 includes a body 320 provided on its top surface with a first tree-structured groove array 340 which consists of first sub-grooves 342 and second sub-grooves 344, and a support 330 extending from the body 320 and having a thickness less than that of the body 320.

The body 320 is formed with first sub-grooves 342 having 8 in number on its input end (a section taken along the line $P_6$—$P_6$). The body 320 is formed with first and second sub-grooves 342 and 344, respectively, having sixteen in total number on its output end (a section taken along the line $P_1$—$P_1$), in which each of the second eight sub-grooves 344 is formed alternately between the first eight sub-grooves 342.

Referring to FIGS. 5A to 5F, approaching the first sub-grooves 342 from the input end of the body 320 to the output end, the depth and pitch of the first sub-grooves 342 decrease. Accordingly, the depths can be represented as $D_{11} > D_{12} > D_{13} > D_{14} > D_{15} > D_{16}$ and the pitches can be represented as $W_{11} > W_{12} > W_{13} > W_{14} > W_{15} > W_{16}$. In contrast, as approaching the second sub-grooves 344 from the input end of the body 320 to the output end, the depths of the second sub-grooves 342 increase and can be represented as $D_{21} < D_{22} < D_{23}$ and the pitches also increase, $W_{21} < W_{22} < W_{23}$. As explained hereinafter, the body 320 is provided with the tree-structured groove array 340, thereby generating self-alignment of the first and second optical fiber arrays which are seated in the first and second sub-grooves 342 and 344, respectively, and saves the trouble of artificially causing each core of the first and second optical fiber arrays to be seated in the corresponding respective first and second sub-grooves 342 and 344, respectively.

Figure 6:
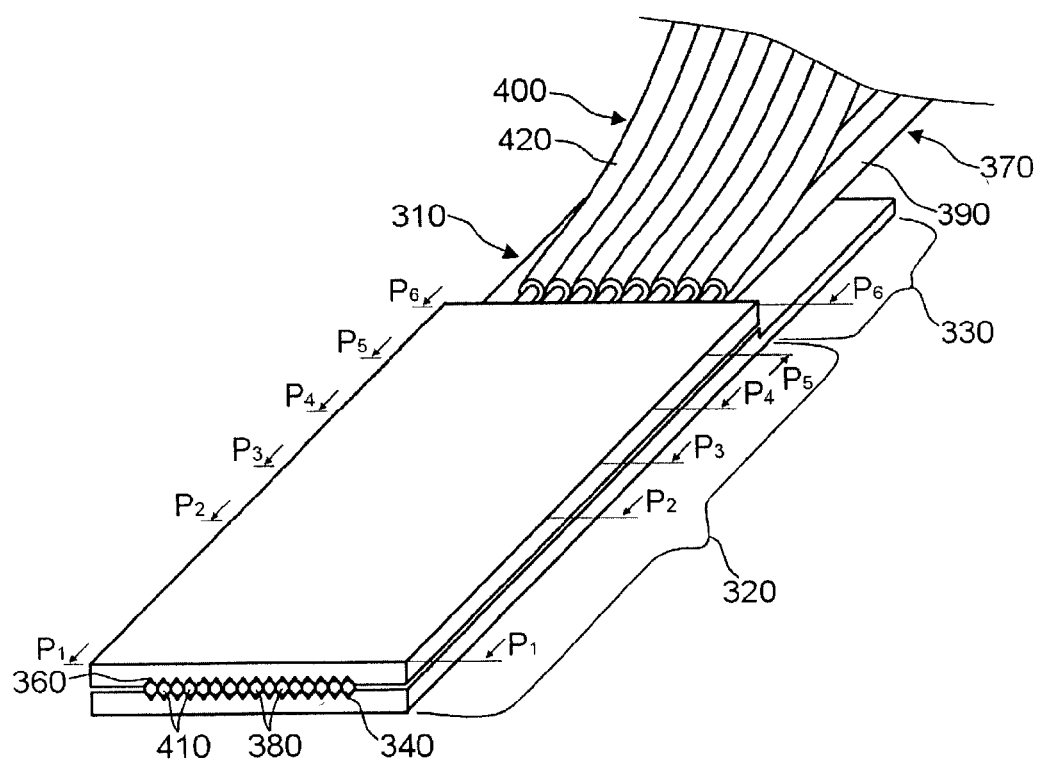
FIG. 6 is a perspective view of a multi-core optical fiber block having tree-structured groove arrays according to another embodiment of the present invention.
Figure 7A:
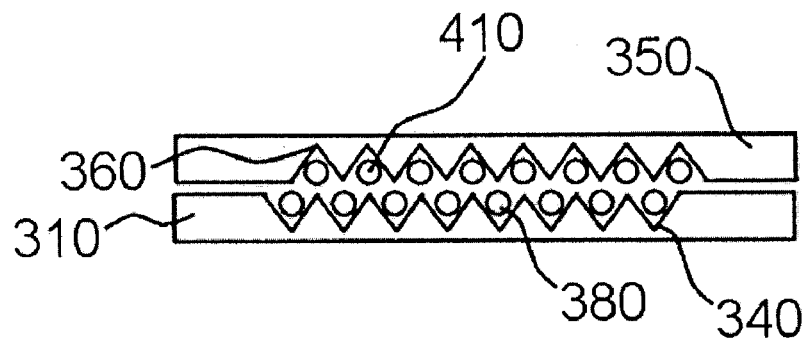
FIGS. 7A to 7F are cross sectional views taken along the lines $P_1$—$P_1$ to $P_6$—$P_6$ of FIG. 6.
Figure 7B:
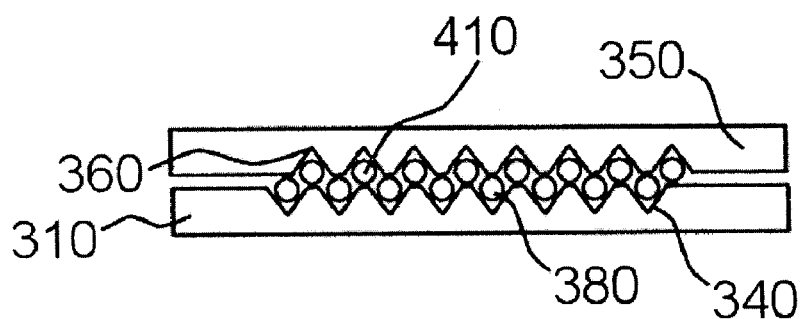
Figure 7C:
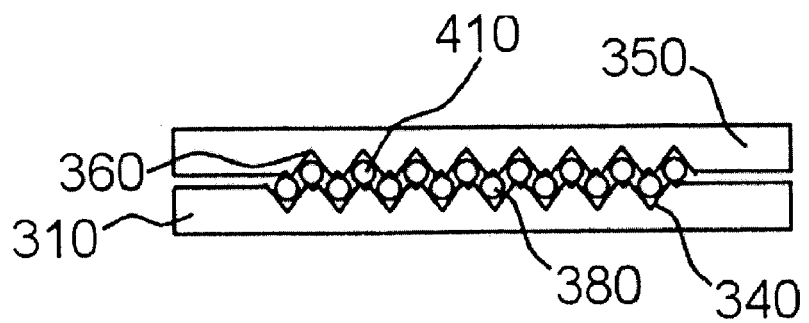
Figure 7D:
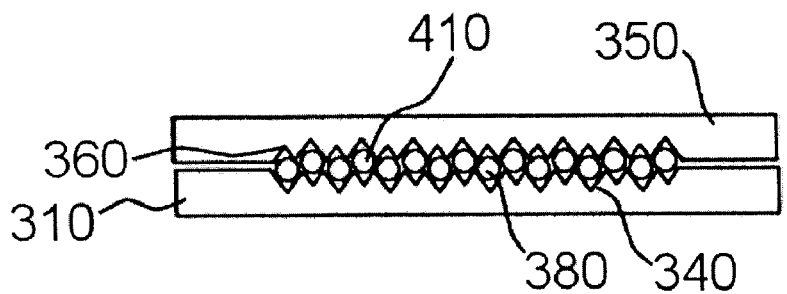
Figure 7E:
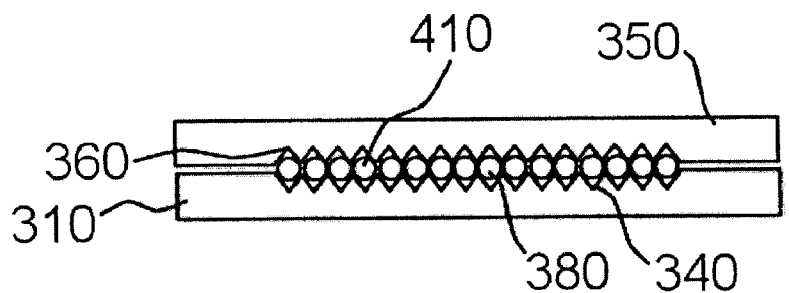
Figure 7F:
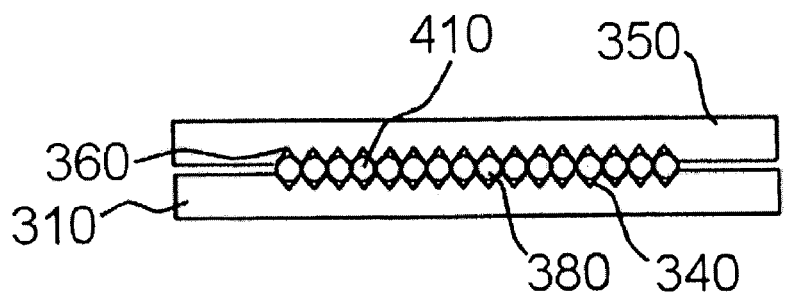
Figure 8:
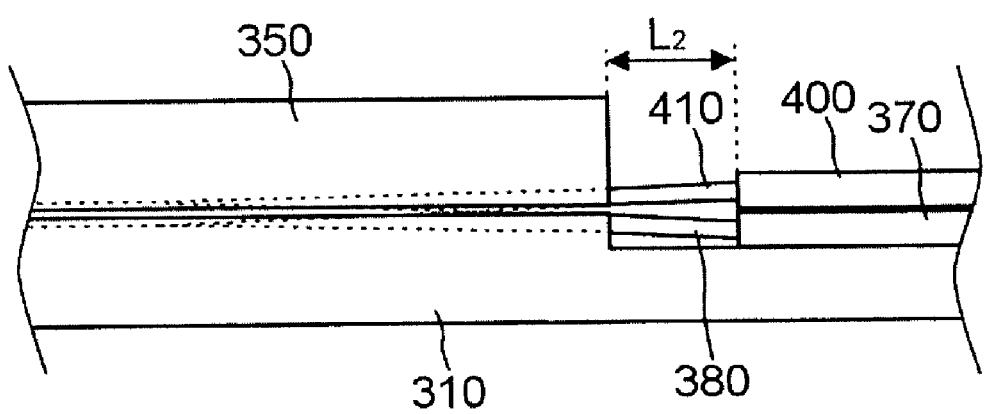
FIG. 8 is a side view of the multi-core optical fiber block shown in FIG. 6.

FIG. 6 is a perspective view of a multi-core optical fiber block having tree-structured groove arrays as shown in FIG. 4. FIGS. 7A to 7F are cross sectional views taken along the lines $P_1$—$P_1$ to $P_6$—$P_6$ of FIG. 6. FIG. 8 is a side view of the multi-core optical fiber block shown in FIG. 6. The multi-core optical fiber block includes first and second ribbon type optical fiber cables 370 and 400, respectively, a block base 310 having a first tree-structured groove array 340, and a cover 350 having a second tree-structured groove array 360.

The first and second ribbon type multi-core optical fiber cables 370 and 400, respectively, are layered horizontally, which have their respective sheaths 390 and 420 removed over a predetermined length at the end. The portions over which the sheaths 390 and 420 of the first and second ribbon type multi-core optical fiber cables 370 and 400, respectively, are de-sheathed are formed into first and second bare or de-sheathed multi-core optical fiber arrays 380 and 410, respectively, each of which comprises eight cores or strands.

The block base 310 includes a body 320 provided with a first tree-structured groove array 340 on a top surface thereof, and a support 330 extending from the body 320 and having a thickness less than that of the body 320. It will be seen from the drawings that an input end of the body 320 (a section taken along the line $P_6$—$P_6$) is provided with eight grooves, while an output end (a section taken along the line $P_1$—$P_1$) is provided with sixteen grooves.

The cover 350 is formed with a second tree-structured groove array 360 on a bottom surface thereof. The cover 350 is provided with eight grooves on its input end (a section taken along the line $P_6$—$P_6$), and sixteen grooves on its output end (a section taken long the line $P_1$—$P_1$).

With reference to FIGS. 7A to 7F, it will be seen that on the input end of the multi-core optical fiber block, the first and second optical fiber arrays 380 and 410, respectively, are each placed in their corresponding first and second groove arrays 340 and 360, and that the first optical fiber array 380 and the first groove array 340 are deflected by a half pitch relative to the second optical fiber array 410 and the second groove array 360. As the first and second groove arrays 340 and 360 approach from the input end of the multi-core optical fiber block to the output end, the maximum pitch and depth of the first and second groove arrays 340 and 360 are decreased gradually until their grooves have a predetermined pitch and depth. With this configuration, the first and second optical fiber arrays 380 and 410 deflected from one another are arranged in a line as they approaching toward the output end thereof. As such, each core of the first and second optical fiber arrays 380 and 410, respectively, stably occupies corresponding rhombic cavities defined by the first and second groove arrays 340 and 360, respectively.

Referring to FIG. 8, it is apparent that the first and second optical fiber arrays 380 and 410, respectively, deflected from each other on the input end of the multi-core optical fiber block are arranged in a line as they approach to the output end of the multi-core optical fiber block according to the teachings of the present invention. Furthermore, since bending of the first and second optical fiber arrays 380 and 410 is minimized in this self-aligning process, the portions of the first and second optical fiber arrays 380 and 410, respectively, seated in the multi-core optical fiber block, may have a reduced length $L_2$, as compared with the prior art, resulting in less incidences of breaking due to contracting and expanding stresses.

Figure 9:
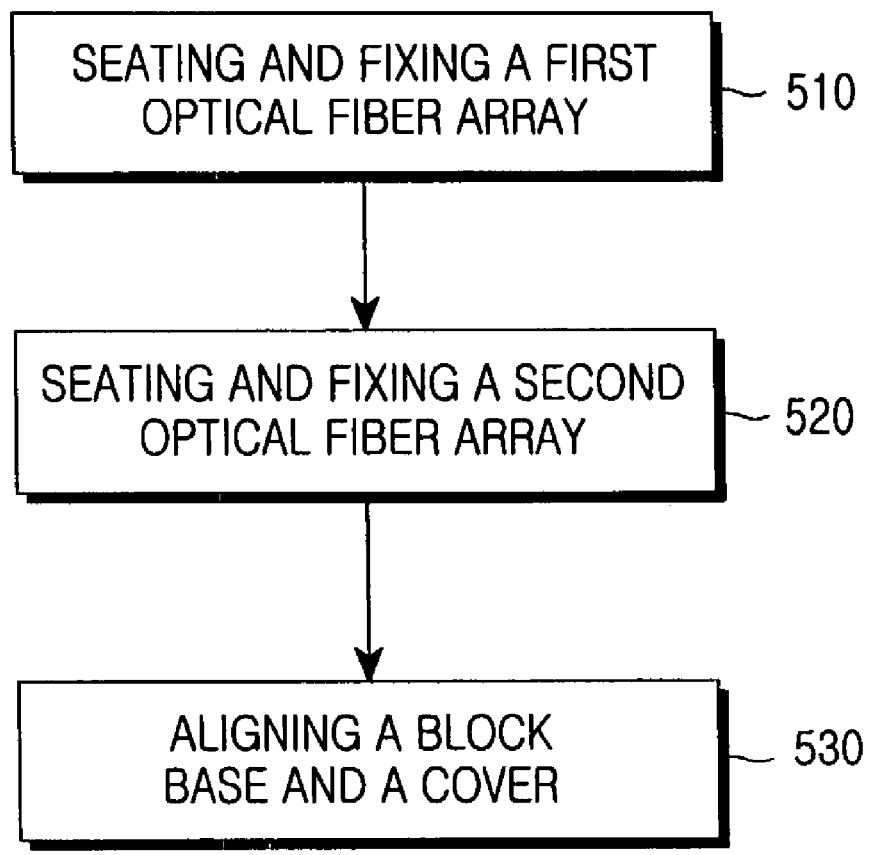
FIG. 9 is a flowchart depicting a method for aligning multi-core optical fiber arrays in a multi-core optical fiber block according to another embodiment of the present invention.
Figure 10:
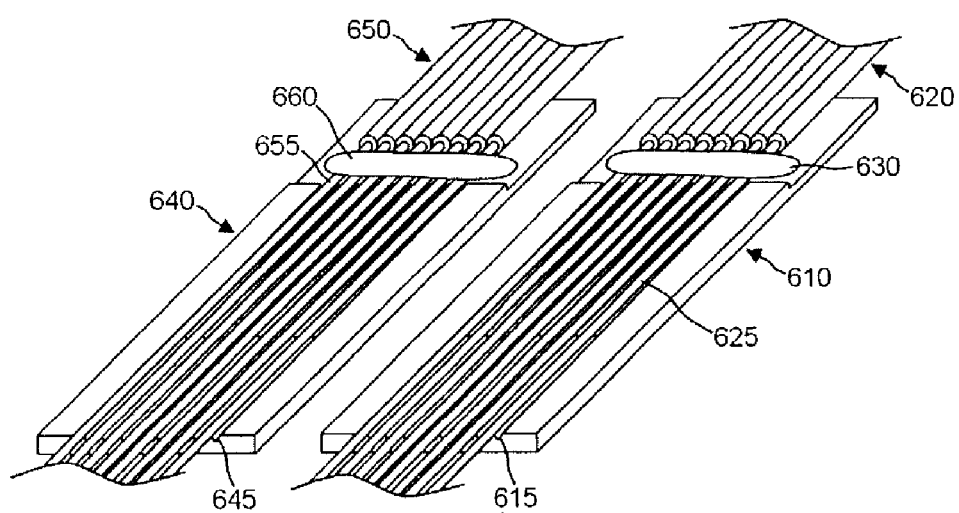
FIGS. 10 to 12 show processes implementing the alignment method disclosed in FIG. 9.
Figure 11:
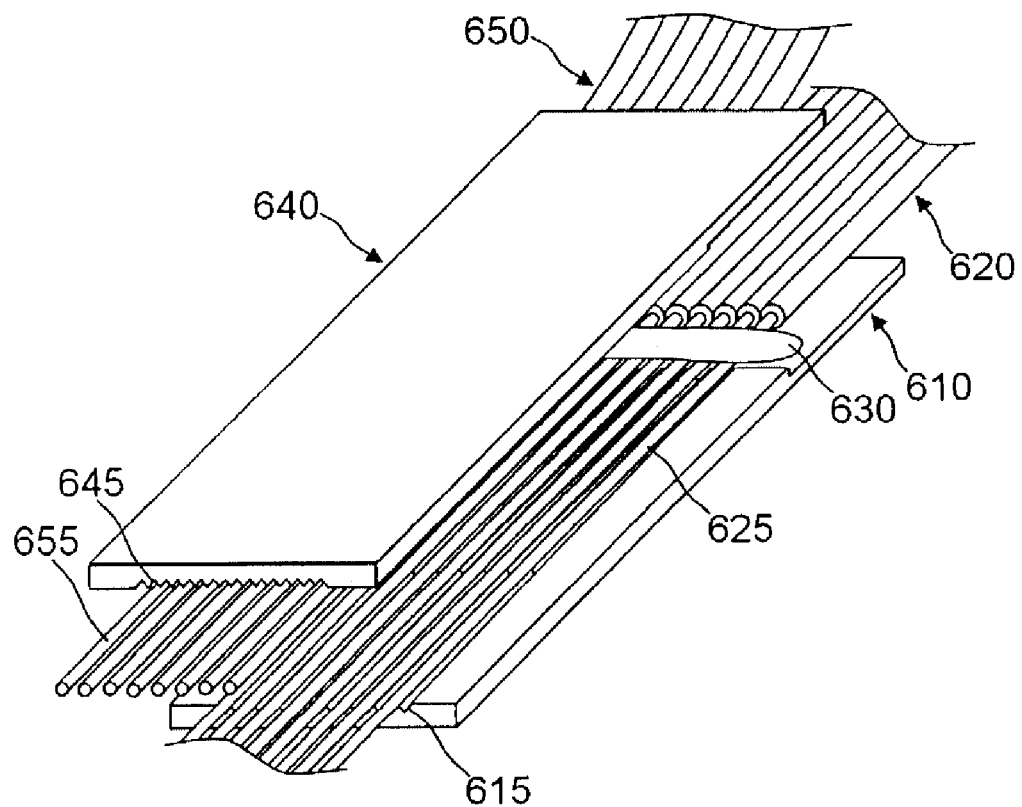
Figure 12:
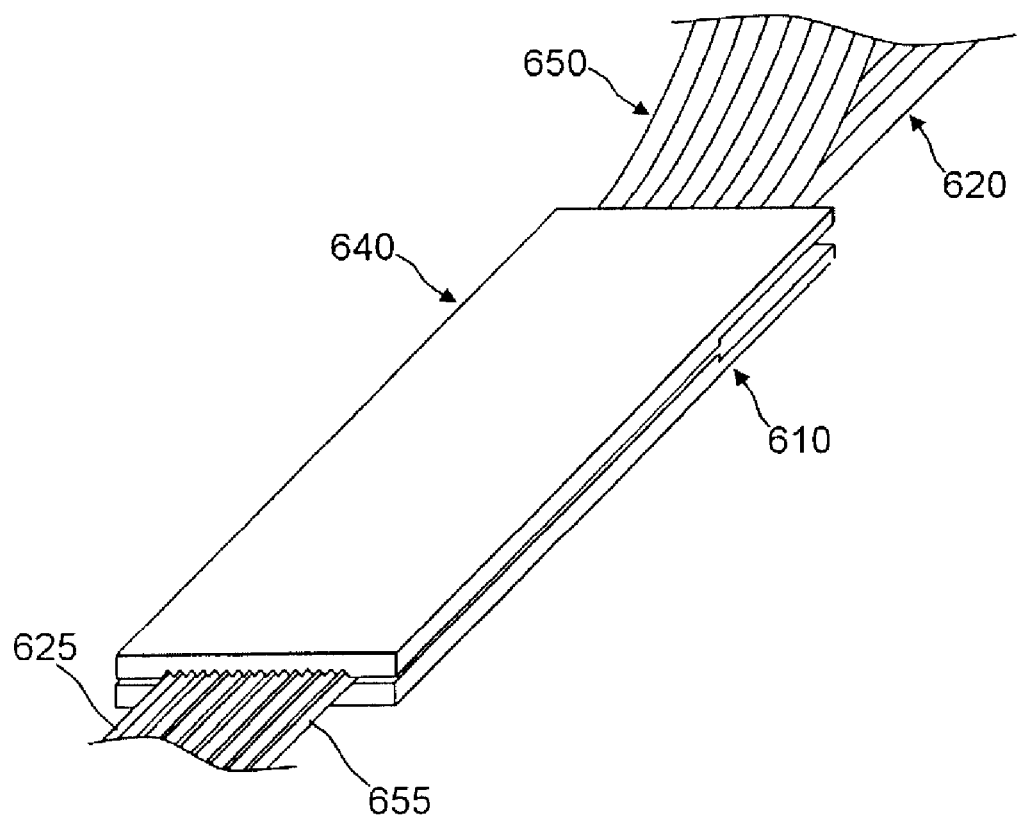

FIG. 9 is a flowchart depicting a method for aligning multi-core optical fiber arrays in a multi-core optical fiber block according to the embodiment of the present invention. FIGS. 10 to 12 show processes implementing the alignment method disclosed in FIG. 9.

Briefly, in the method of aligning a multi-core optical fiber block according to the embodiment of the present invention, a first optical fiber array is seated and fixed (step 510), a second optical fiber array is seated and fixed (step 520), and a block base and a cover are aligned to each other (step 530).

In step 510 for seating and fixing the first optical fiber array 625, the first optical fiber array 625 is seated in a first tree-structured groove array 615 of the block base 610, and then epoxy resin 630 is applied to a portion of the first optical fiber array 625 extending beyond the block body, to adhere it to a support. The first optical fiber array 625 is seated in the first groove array 615 consisting of sixteen grooves. Here, the first optical fiber array 625 is seated in the odd grooves of the first groove array 615 formed on an output end of the block base 610. Next, epoxy resin 630 is applied to the portion of the first optical fiber array 625 extending beyond the block base, to adhere it to the support.

In step 520 for seating and fixing the second optical fiber array 655, the second optical fiber array 655 is seated in a second tree-structured groove array 645 of the cover 640. Further, the second optical fiber array 655 is seated in the second groove array 645 having sixteen grooves. Here, the second optical fiber array 655 is seated in the even grooves of the second groove array 645 formed on an output end of the cover 640. That is, the second optical fiber array 655 is seated in a staggered formation with respect to the first optical fiber array 625. Thereafter, epoxy resin 630 is applied to the portion of the second optical fiber array 655 extending beyond the optical fiber block body to adhere it to a support.

In step 530 for aligning the block base and the cover to each other, the cover 640 is positioned on the block base 610 in alignment with the block base 610. As shown, in FIGS. 11 and 12, the cover 640 shown in FIG. 10 is turned over and then aligned on the block base 610.

Figure 13:
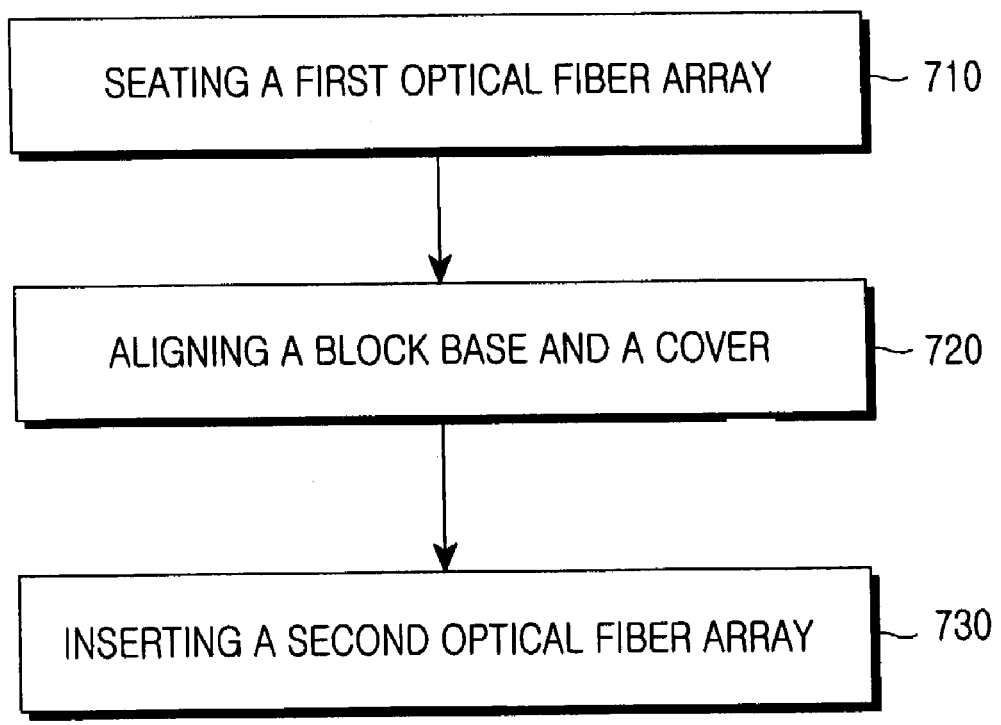
FIG. 13 is a flowchart depicting a method for aligning multi-core optical fiber arrays in a multi-core optical fiber block according to another embodiment of the present invention.
Figure 14:
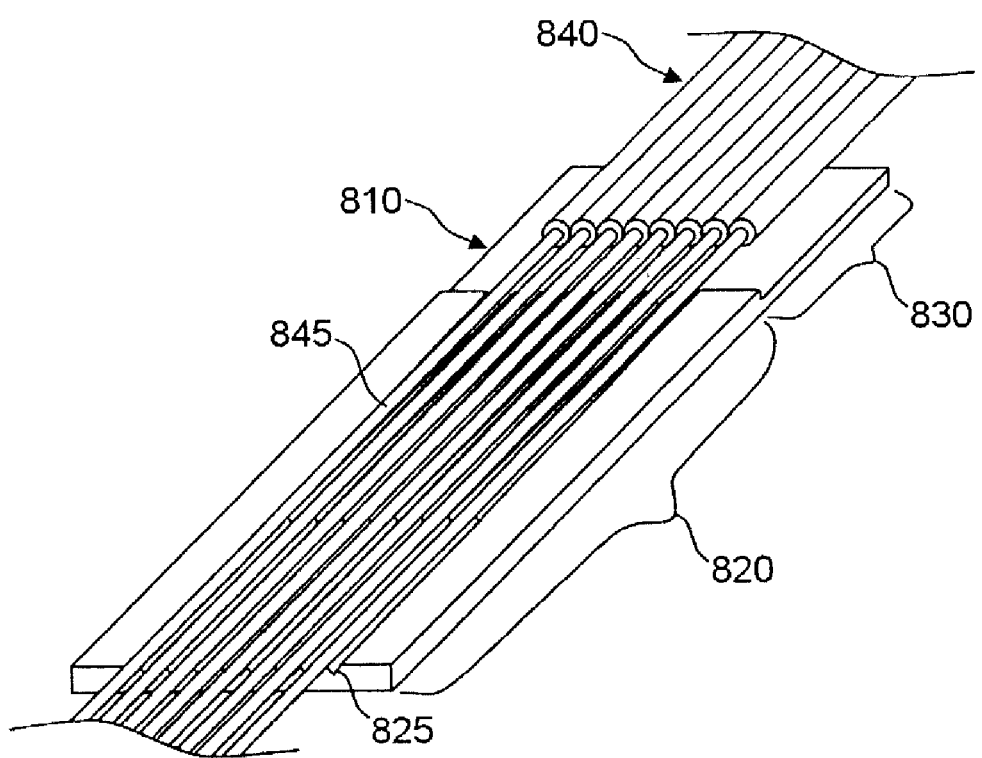
FIGS. 14 to 17 show processes implementing the alignment method disclosed in FIG. 13.

FIG. 13 is a flowchart depicting a method for aligning multi-core optical fiber arrays in a multi-core optical fiber block according to another preferred embodiment of the present invention. FIGS. 14 to 17 show processes implementing the alignment method disclosed in FIG. 13. In the method for aligning a multi-core optical fiber block according to this embodiment, a first optical fiber array is seated (step 710), a block base and a cover are aligned to each other (step 720), and a second optical fiber array is inserted (step 730).

In step 710 for seating the first optical fiber array 845, the first optical fiber array 845 is seated in a first tree-structured groove array 825 of the block base 810. The block base 810 includes a body 820 provided with a first groove array 825 having sixteen grooves on a top surface thereof, and a support 830 extending from the body 820, wherein the first optical fiber array 845 is seated in the first groove array 825. At this time, the first optical fiber array 845 is seated in the odd grooves of the first optical fiber array 845 formed on an output end of the block base 810.

Figure 15:
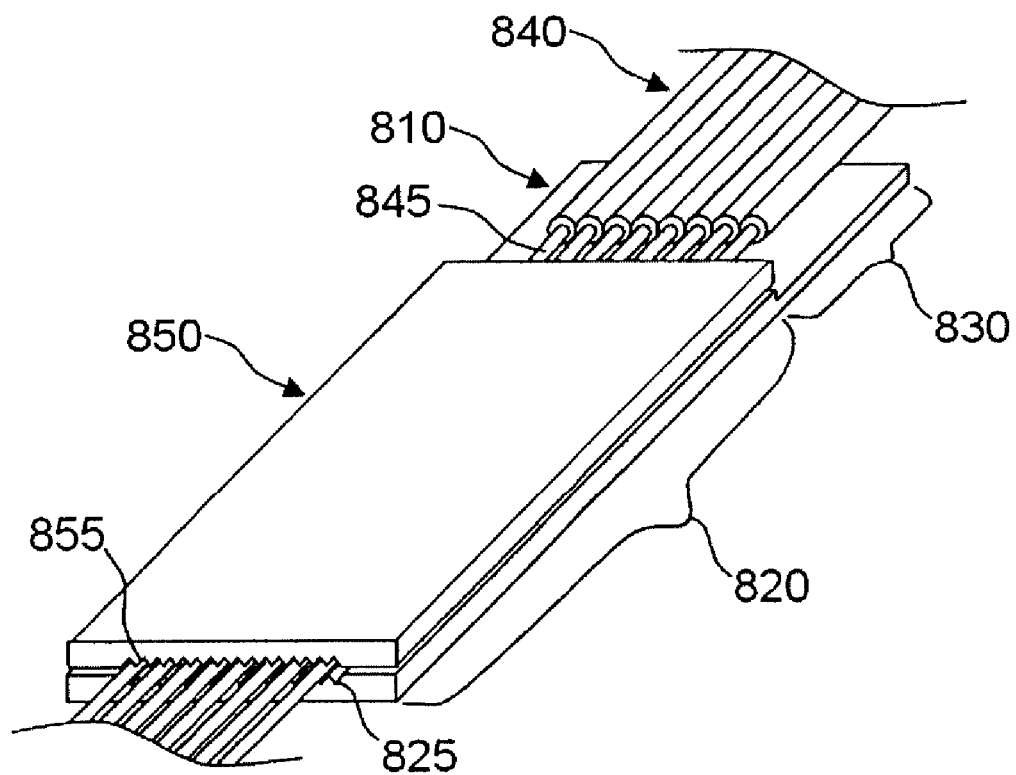

In step 720 for aligning the block base and the cover to each other, the cover 850 is positioned on the body 820 of the block base 810 in alignment with the body 820. As shown in FIG. 15, the cover 850 is provided on its bottom surface with a second groove array 855 having sixteen grooves, and that the cover 850 is aligned on the body 820 of the block base 810.

Figure 16:
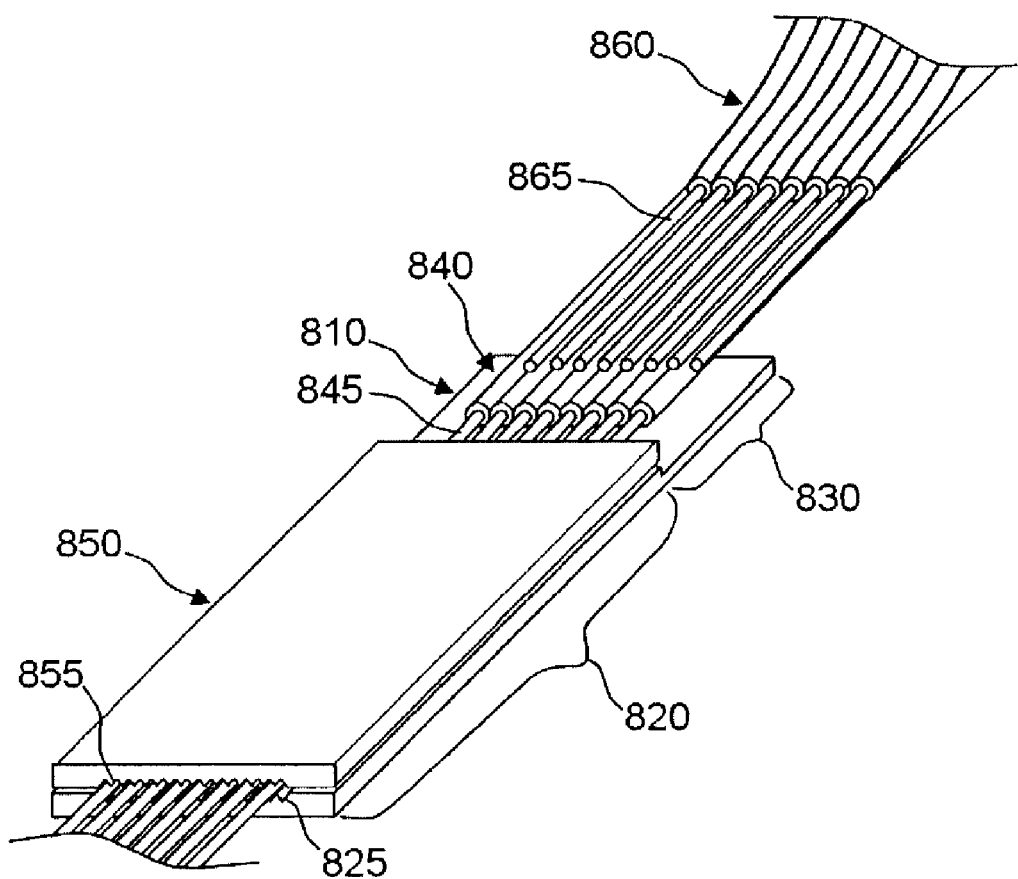
Figure 17:
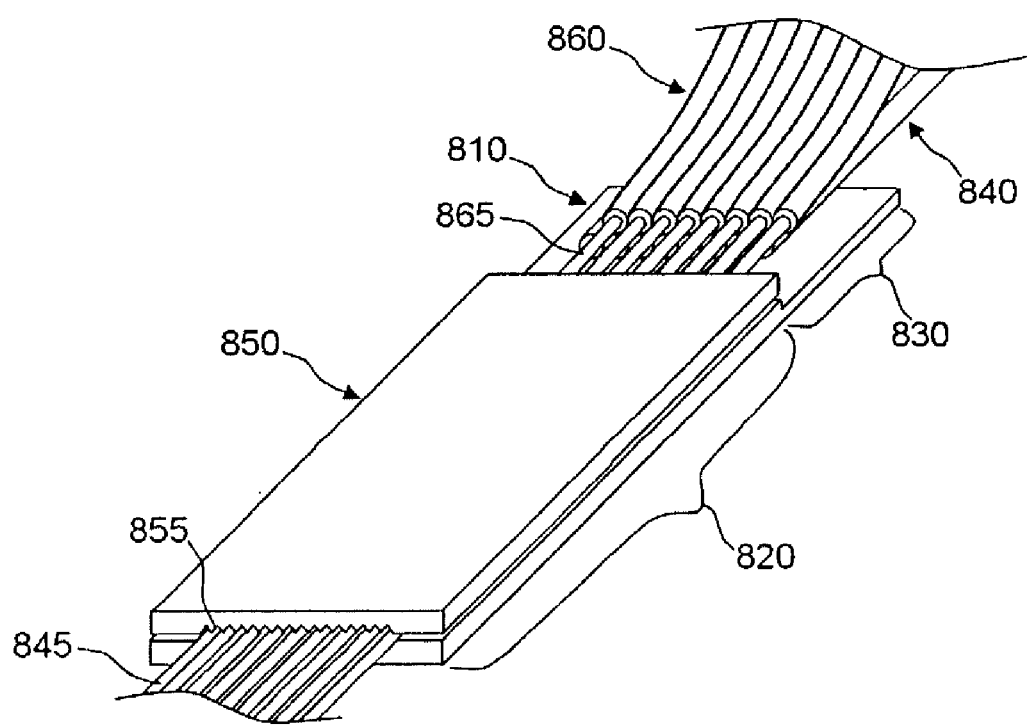

In step 730 for inserting the second optical fiber array, the second optical fiber array 865 is inserted into eight cavities which are formed on an input end of the multi-core optical fiber block. As shown in FIGS. 16 and 17, the second optical fiber array 865 is inserted through the input end of the multi-core optical fiber block until the leading end of the second optical fiber array 865 passes through the even cavities of the sixteen cavities formed on an output end of the multi-core optical fiber block. In this insertion process, the second optical fiber array 865 is inserted during a sliding movement on the first ribbon type optical fiber cable 840. Here, due to the first optical fiber array 845, which is seated in the odd grooves of the first groove array 825 formed on the output end of the block base 810, and due to a self-aligning effect of the first optical fiber array 845, the second optical fiber array 865 is seated in the even grooves of the first groove array 825 formed on the output end of the block base 810.

Figure 18:
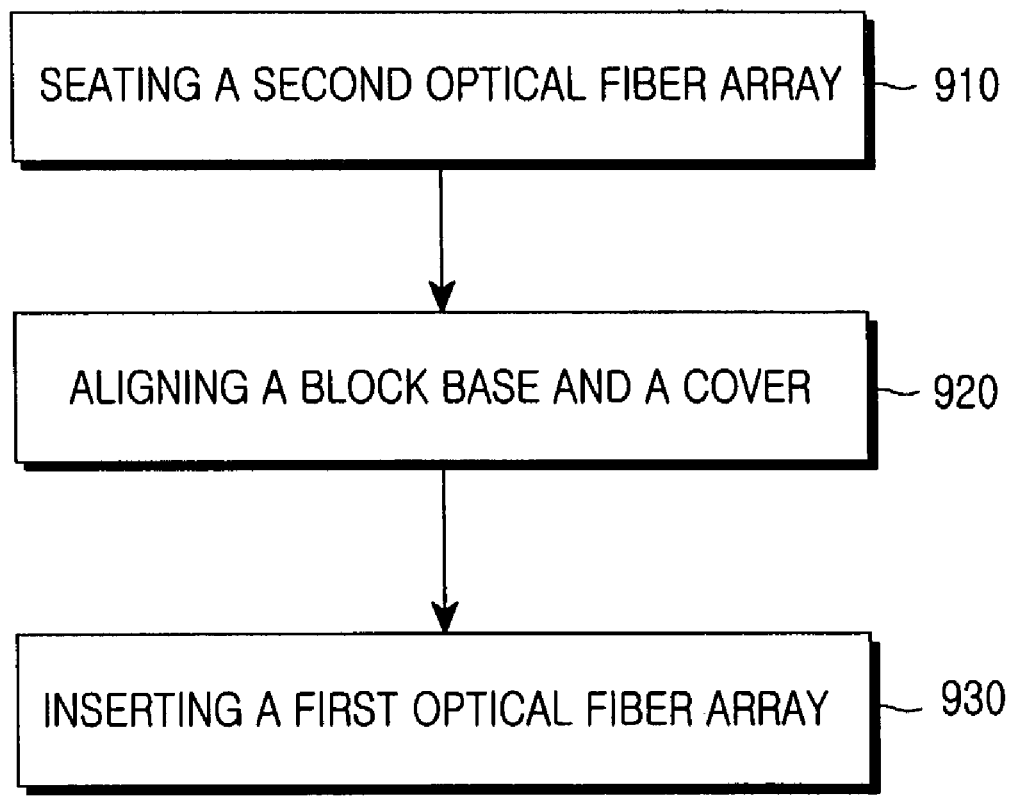
FIG. 18 is a flowchart depicting a method for aligning multi-core optical fiber arrays in a multi-core optical fiber block according to another embodiment of the present invention; and, FIGS. 19 to 21 show processes implementing the alignment method disclosed in FIG. 18.
Figure 19:
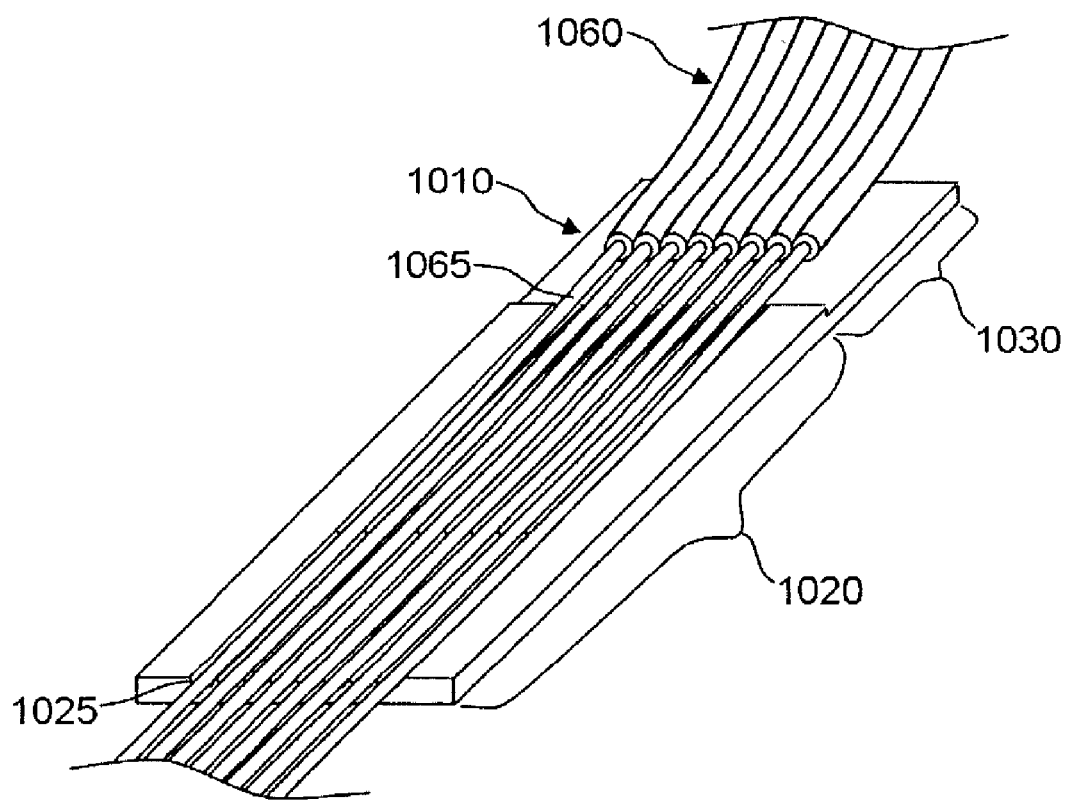
Figure 20:
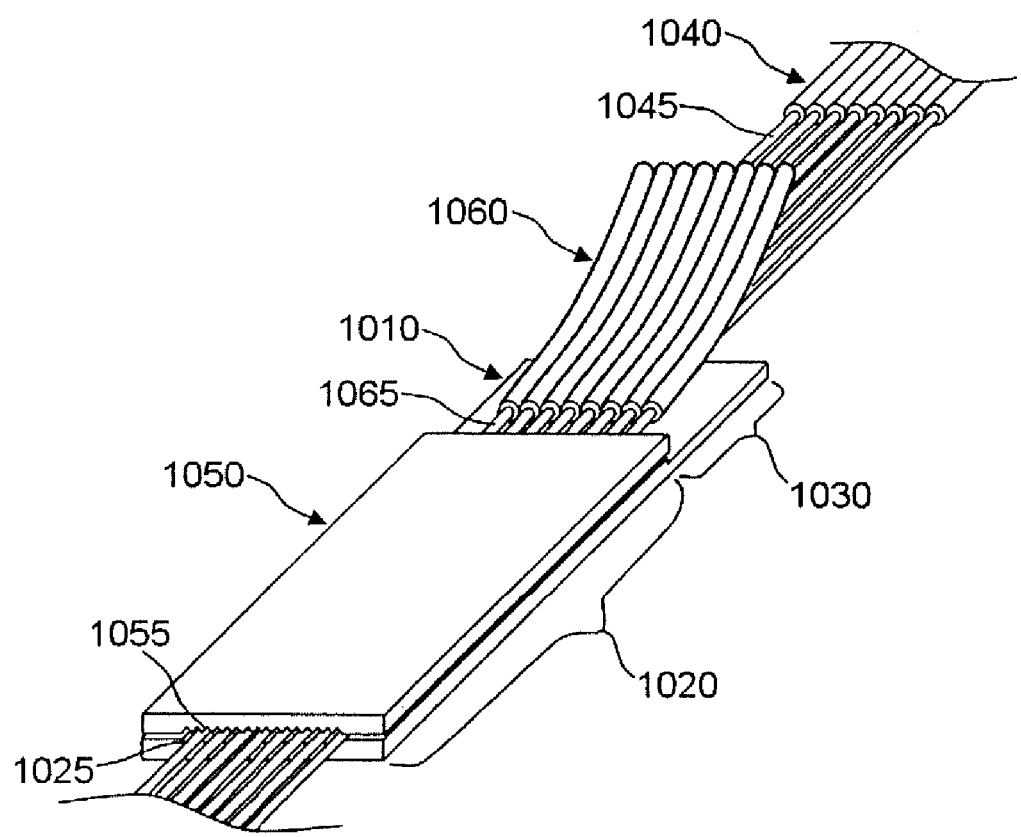
Figure 21:
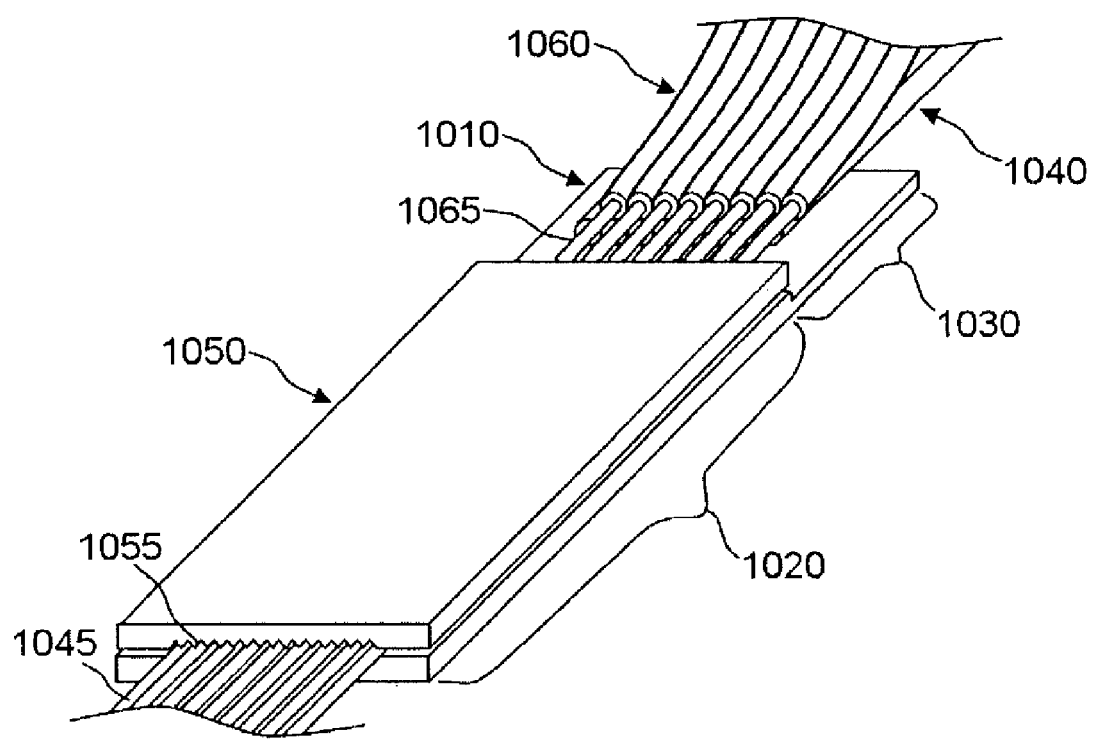

FIG. 18 is a flowchart depicting a method for aligning multi-core optical fiber arrays in a multi-core optical fiber block according to another embodiment of the present invention. FIGS. 19 to 21 show processes implementing the alignment method disclosed in FIG. 18. In the method for aligning multi-core optical fiber arrays in multi-core optical fiber block according to this embodiment, a second optical fiber array is seated (step 910), a block base and a cover are aligned to each other (step 920), and a first optical fiber array is inserted (step 930).

In step 910 for seating the second optical fiber array, the second optical fiber array 1065 is seated on the block base 1010 having a first tree-structured groove array 1025. The block base 1010 includes a body 1020 provided with the first groove array 1025 having sixteen grooves on a top surface thereof, and a support 1030 extending from the body 1020, wherein the second optical fiber array 1065 is seated in the first groove array 1025. At this time, the second optical fiber array 1065 is seated in the even grooves of the first groove array 1025 formed on an output end of the block base 1010.

In step 920 for aligning the block base and the cover to each other, the cover 1050 is positioned on the body 1020 of the block base 1010 in alignment with the body 1020.

In step 930 for inserting the first optical fiber array, the first optical fiber array 1045 is inserted into eight cavities which are formed on an input end of the multi-core optical fiber block. As shown in FIGS. 20 and 21, the first optical fiber array 1045 is inserted through the input end of the multi-core optical fiber block until the leading end of the first optical fiber array 1045 passes through the odd cavities of the sixteen (16) cavities formed on an output end of the multi-core optical fiber block. In this insertion process, the second ribbon type optical fiber cable 1060 is raised so as to allow the first optical fiber array 1045 to run under the optical fiber cable 1060, the first optical fiber array 1045 is inserted during a sliding movement under the second ribbon type optical fiber cable 1060. Here, due to the second optical fiber array 1065, which is seated in the even grooves of the first groove array 1025 formed on the output end of the block base 1010, and due to a self-aligning effect of the second optical fiber array 1065, the first optical fiber array 1045 is seated in the odd grooves of the first groove array 1025 formed on the output end of the block base 1010.

As described above, both the block base having tree-structured groove arrays and the multi-core optical fiber block using the same according to the present invention have an advantage in that they maximize the number of cavities on the input end into which the optical fiber array is inserted, but also make use of the self-aligning inductive effect of the block base, thereby minimizing the bending of the optical fiber array.

Further, the method for aligning the multi-core optical fiber block having tree-structured groove arrays has an advantage in that the first and second ribbon type optical fiber cables can be simply aligned with each other by sliding the second ribbon type optical fiber cable on or under the first ribbon type optical fiber cable seated on the block having tree-structured groove arrays.

While the invention has been shown and described with reference to a preferred embodiment thereof, it will be understood by those skilled in the art that various changes in form and details may be made therein without departing from the spirit and scope of the invention as defined by the appended claims. Therefore, this invention is not to be unduly limited to the embodiment set forth herein, but to be defined by the appended claims and equivalents thereof.

What is claimed is:

1. A block base having a groove array to allow an optical fiber arrays to be seated in the groove array, the groove array comprising:
   a first optical fiber array; a second optical fiber array;
   first sub-grooves having a depth and a pitch decreasing from an input end of the block base to an output end of the block base and for receiving the first optical fiber array; and,
   second sub-grooves formed alternately between the first sub-grooves and having a depth and a pitch increasing from the input end of the block base to the output end of the block base and for receiving the second optical fiber array.

2. The block base according to claim 1, wherein the block base comprises:
   a body formed with the groove array on a top surface thereof; and,
   a support extending from the body and having a thickness substantially less than that of the body.

3. The block base according to claim 1, further comprising a cover having third grooves on a bottom surface thereof and aligned with the block base to cover the first and second optical fiber arrays.

4. A block base having a groove array to allow an optical fiber array to be seated in the groove array, the groove array comprising:
   first sub-grooves having a depth and a pitch decreasing from an input end of the block base to an output end of the block base and for receiving a first optical fiber array; and,
   second sub-grooves formed alternately between the first sub-grooves and having a depth and a pitch increasing from the input end of the block base to the output end of the block base and for receiving a second optical fiber array, wherein the first optical fiber array and the first grooves are deflected by a half pitch relative to the second optical fiber array.

5. The block base according to claim 4, wherein the block base comprises:
   a body formed with the groove array on a top surface thereof; and,
   a support extending from the body and having a thickness less than that of the body.

6. The block base according to claim 4, further comprising a cover having third grooves on a bottom surface thereof and aligned with the block base to cover the first and second optical fiber arrays.

* * * * *